Aug. 11, 1964 GERHARD-GÜNTER GASSMANN 3,144,612

PHASE- AND FREQUENCY-COMPARISON CIRCUIT
COMPRISING TWO RECTIFYING SECTIONS

Filed May 26, 1960 6 Sheets-Sheet 1

INVENTOR
GERHARD-GÜNTER GASSMANN

BY Matthew M. Russo
ATTORNEY

INVENTOR
GERHARD-GÜNTER GASSMANN

BY Matthew M. Russo
ATTORNEY

Aug. 11, 1964 GERHARD-GÜNTER GASSMANN 3,144,612

PHASE- AND FREQUENCY-COMPARISON CIRCUIT COMPRISING TWO RECTIFYING SECTIONS

Filed May 26, 1960 6 Sheets-Sheet 3

INVENTOR

GERHARD-GÜNTER GASSMANN

BY Matthew M Russo

ATTORNEY

Aug. 11, 1964 GERHARD-GÜNTER GASSMANN 3,144,612
PHASE- AND FREQUENCY-COMPARISON CIRCUIT
COMPRISING TWO RECTIFYING SECTIONS
Filed May 26, 1960 6 Sheets-Sheet 4

INVENTOR
GERHARD-GÜNTER GASSMANN
BY Matthew M Russo
ATTORNEY

INVENTOR
GERHARD-GÜNTER GASSMANN
BY Matthew M. Russo
ATTORNEY

Aug. 11, 1964 GERHARD-GÜNTER GASSMANN 3,144,612

PHASE- AND FREQUENCY-COMPARISON CIRCUIT COMPRISING TWO RECTIFYING SECTIONS

Filed May 26, 1960 6 Sheets-Sheet 6

INVENTOR
GERHARD-GÜNTER GASSMANN

BY Matthew M. Russo
ATTORNEY 3,144,612

PHASE- AND FREQUENCY-COMPARISON CIRCUIT COMPRISING TWO RECTIFYING SECTIONS

Gerhard-Günter Gassmann, Berkheim, Germany, assignor to International Standard Electric Corporation, New York, N.Y., a corporation of Delaware Filed May 26, 1960, Ser. No. 31,923
Claims priority, application Germany June 4, 1959
10 Claims. (Cl. 328—133)

The most common method used nowadays for the synchronization of the horizontal deflection in television receivers is the so-called follower or subsequent synchronization method. In this method the phase of the horizontal deflecting voltage is compared with the phase of the sync pulses in a phase comparator. The control voltage as obtained from this phase comparison is filtered and is fed either directly to the oscillator for effecting the frequency retuning, above all when there is concerned a multivibrator or suppression oscillator, or it is fed to a separate frequency-retuning circuit, for example, in cases where the oscillator operates as a sine-wave oscillator. The advantage of this type of circuit arrangement over a direct synchronization resides in the good noise-suppression resulting from the filtering of the control voltage. However, it is a substantial disadvantage that just this filtering limits the synchronizing pull-in range. The better the filtering and, consequently, the noise-suppression, the smaller also is the pull-in range. Accordingly, a compromise has to be made in practice. Although, as already mentioned, the pull-in range is decreased by the filtering, the hold range, that is, the frequency range in which a once obtained synchronization is sustained is extended by the filtering. Generally, therefore, the hold range is substantially larger than the pull-in range. If somewhat linear conditions exist in the generation of the control voltage and in the associated frequency retuning, then the pull-in range lies symmetrically in the centre of the hold range. This condition is generally desirable. However, in the design of the control-voltage filtering circuits a compromise is necessary because of the requirement for a manual retuning device (manual control button on the television receiver) to extend the pull-in range. If the pull-in range is made so large that the manual control can be eliminated, then only a very poor noise-suppression is achievable.

The inventive circuit arrangement affords both a large pull-in range and a high degree of noise-suppression, so that external manual re-tuning elements are unnecessary. The invention is in particular concerned with a comparison circuit which provides a phase-dependent control voltage if the frequencies of the signals being compared are equal, and a frequency-dependent control voltage if the frequencies being compared are different. In both cases the circuit arrangement operates symmetrically, in other words, for a nominal phase and rated frequency the control output voltage is stabilized. In case of a deviation of the phase or frequency respectively, a director or directional voltage is produced with the polarity necessary for the retuning of the deflecting generator to the rated frequency and nominal phase. Disregarding the technical advantages, the circuit arrangement is featured by its special economy, because in the final form only two diodes and a few resistors and capacitors are required. The investment in circuitry is equal or only slightly higher than that associated with the conventional types of phase-comparison circuits not providing a frequency, comparison.

There is another known phase- and frequency-comparison circuit employing two diodes. However, this circuit arrangement, additionally still requires an oscillating circuit. With respect to its mode of operation it is designed exclusively for effecting comparisons of sinusoidal voltages, and is not suitable for use in the comparison of pulsing voltages without additional selection means, by which the pulses are first of all converted into sinusoidal voltages. Accordingly, this circuit arrangement, for economical reasons, appears to be unsuitable for the phase- and frequency-comparison required for effecting synchronization of the horizontal deflection in a television receiver.

The inventive type of circuit arrangement, however, in its function, is particularly adapted to the phase and frequency comparison of pulse-shaped or sawtooth-like voltages. The invention is particularly concerned with a phase- and frequency-comparison circuit employing two rectifying sections which, in the case of a coinciding frequency of the two signals to be compared, delivers a phase-dependent control voltage, which is filtered and, in the case of a non-coinciding frequency, produces a difference-frequency voltage whose polarity is a function of the drift direction. This difference-frequency voltage is used for obtaining a sufficiently high control voltage for modulating the next successive retuning stage, and whose polarity likewise is a function of the drift direction.

A phase and frequency comparison of sinusoidal voltages is also possible if the voltages are previously converted into impulse voltages. The inventive type of circuit arrangement is of interest, where sinusoidal oscillating circuits appear to be uneconomical, for instance, in the case of very low frequencies.

These and other objects and features of the present invention may be more fully appreciated when considered in connection with the following description to be read in association with the accompanying drawings wherein.

Figure 7:
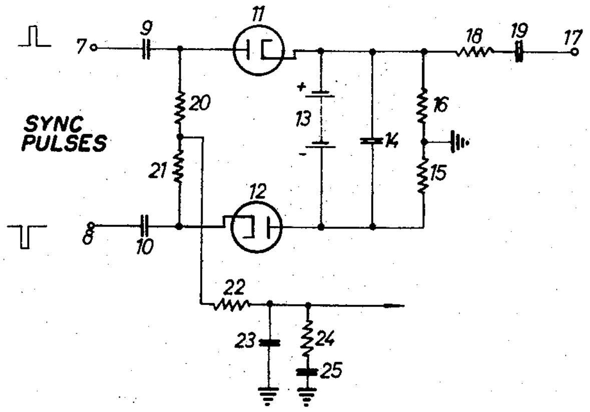
FIGURE 7 is a circuit diagram illustrating an exemplary arrangement for handling pulse-shaped signals in accordance with the present invention.
Figures 8, 9, 10, 11, 12, 13, 14:
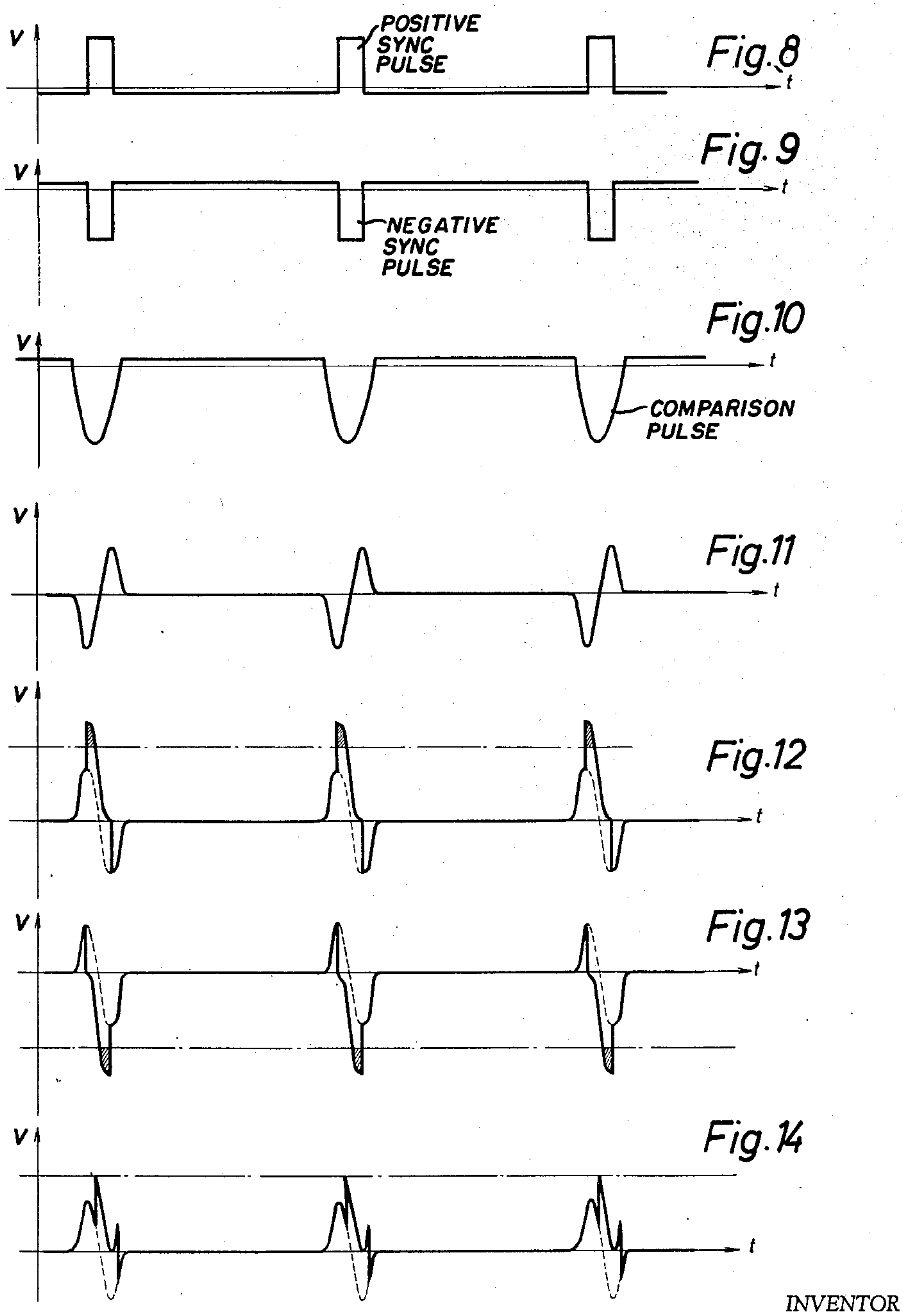
FIGURE 8 is a plot illustrating the synchronizing pulses applied to the terminal 7 in FIGURE 7.
FIGURE 9 is a plot illustrating the synchronizing pulses applied to the terminal 8 in FIGURE 7.
FIGURE 10 is a plot illustrating the comparison impulses applied to the terminal 17 of FIGURE 7.
FIGURE 11 illustrates the differentiated comparison impulses applied to diode 11 of FIG. 7.

FIGURES 12 and 13 are plots which respectively illustrate the voltages across the diodes 11 and 12 in FIGURE 7, when the synchronizing and synchronized signals are synchronous in both phase and frequency.

Figure 15:
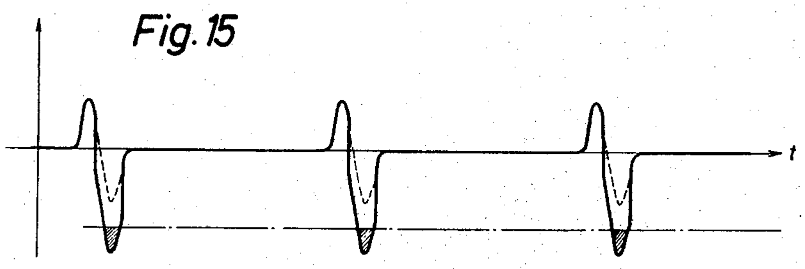

FIGURES 14 and 15 are plots illustrating the effects of a phase deviation on the voltages across the diodes 11 and 12.

FIGURE 16 includes three plots *a*, *b*, and *c* graphically illustrating the relationship between the difference frequency and the control voltage output for two different rectifying section biasing arrangements.

Figure 17:
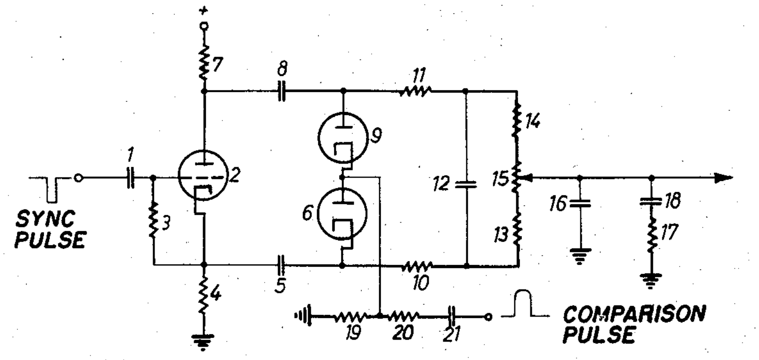

FIGURE 17 is a circuit diagram illustrating an exemplary arrangement in accordance with the present invention employing a variably tapped output resistor for adding a D.C. biasing potential to the control signal forwarded to a retuning stage in accordance with the present invention.

Figure 18:
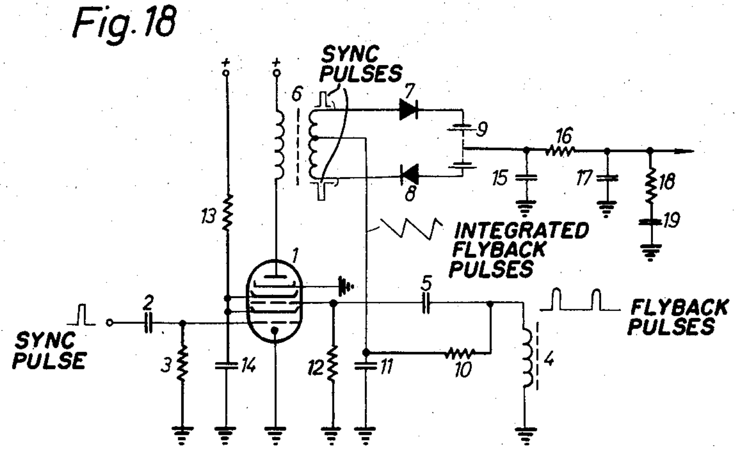
Figure 19:
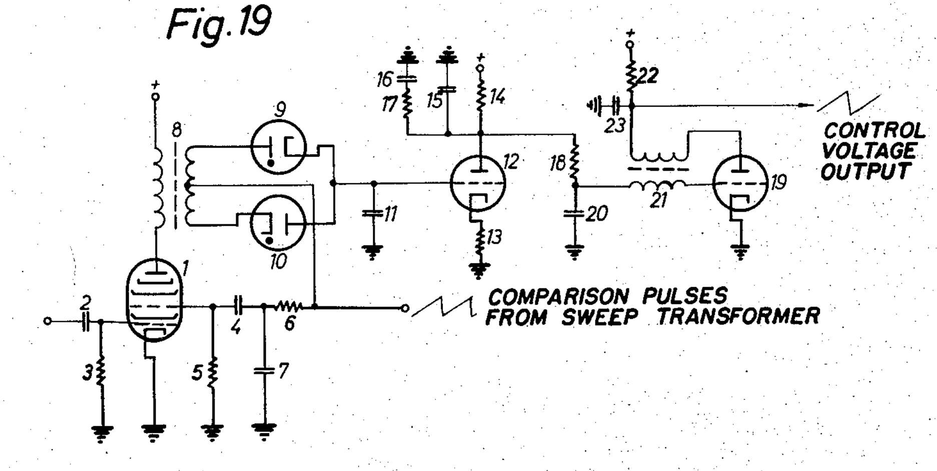

FIGURE 18 is a circuit diagram illustrating still another embodiment of a circuit for synchronizing the horizontal oscillations in a television receiver in accordance with the present invention, and FIGURE 19 shows a modified circuit arrangement in accordance with this invention for synchronizing the vertical oscillations of a television receiver.

Figure 1:
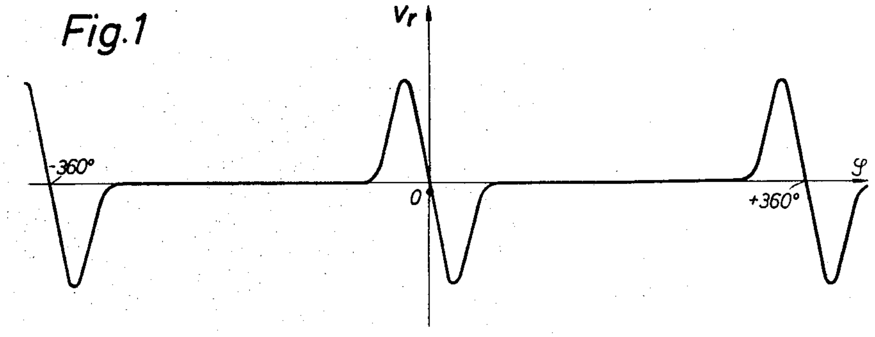
FIGURE 1 is a plot illustrating the time characteristics of a synchronizing control voltage.
Figure 2:
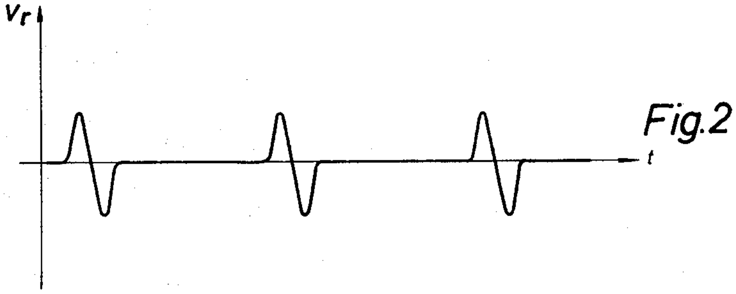
FIGURE 2 is plot illustrating the difference frequency output of an ordinary phase discriminating circuit for a deviation in the controlled frequency relative to the synchronizing signal frequency in a given sense.
Figure 3:
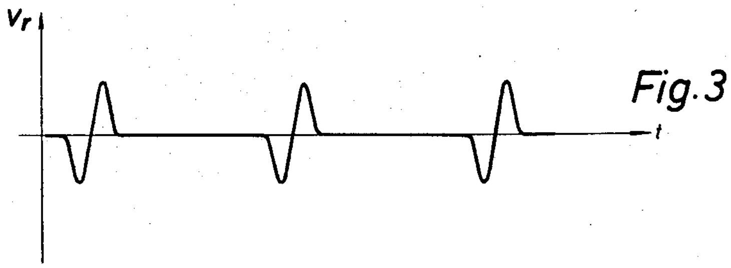
FIGURE 3 is a plot illustrating the output of a phase discriminator for a frequency deviation in a sense opposite to that in FIGURE 2.
Figure 4:
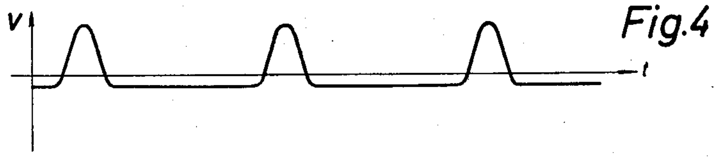
FIGURE 4 is a plot illustrating the effect produced by the present arrangement for a frequency deviation of the type considered in FIGURE 2.
Figure 5:
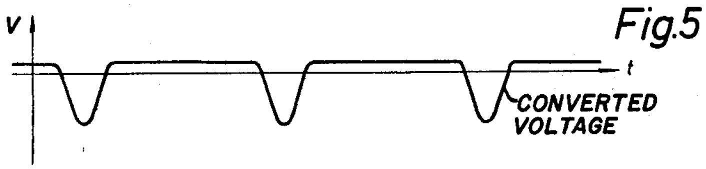
FIGURE 5 is a plot illustrating the effect produced by the present arrangement for a deviation of the type considered in FIGURE 3.
Figure 6:
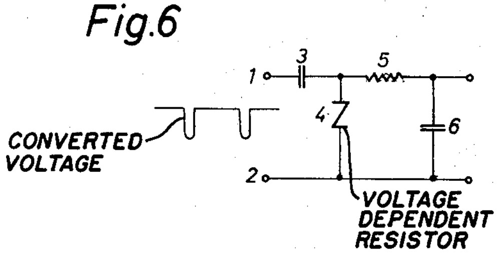
FIGURE 6 is a circuit diagram illustrating an additional rectifier arrangement in accordance with the present invention employing a voltage controlled resistor.

Generally, the control characteristic of a phase-comparison circuit is defined by the relationship between the control voltage and the phase difference of the voltages to be compared. One typical control characteristic is shown in FIG. 1. If there is no coincidence between the frequencies of the two voltages to be compared, then the phase continuously passes at the angular velocity which corresponds to the difference frequency. Accordingly, the output voltage in front of the control-voltage filter elements, and quite depending on the direction of the frequency deviation, has the shape as shown in FIGS. 2 or 3. As will be seen, the polarity of the difference-frequency voltage depends on the direction of the frequency deviation. The first step in the inventive type of circuit arrangements consists in converting this difference-frequency voltage in such a way that it assumes such a course with respect to time that the voltage-peak value of the one polarity is substantially higher than the peak value of the other polarity. When converting, for example, the voltage as shown in FIG. 2, than a voltage according to FIG. 4 will be obtained. The positive peak value of this voltage is substantially higher than the negative one. However, if the voltage as shown in FIG. 3 is converted, then a voltage according to FIG. 5 is obtained. In case the control characteristic does not have the course as shown in FIG. 1, but is of the sawtooth-shape, then a conversion by means of differentiation is to be preferred. The thus converted difference-frequency voltage is now fed to an additional rectifier arangement which rectifies the positive as well as the negative peak value, and which superimposes the thus obtained positive and negative direct-current voltage, so that the entire director or directional voltage with its polarity will depend on the drift direction. The additional rectifier arrangement for example, may consist of two diodes. As an additional rectifier arrangement, however, it is also possible to use a voltage-dependent or voltage-controlled resistor. A corresponding example is shown in FIG. 6. When applying the converted voltage to the terminals 1 and 2, then the coupling capacitor 3 will feed this voltage to the voltage-dependent resistor 4 which limits the voltage on both sides. The corresponding directional voltage is led-off with the resistor 5, and is filtered with the capacitor 6. As a rule, only one retuning device is supposed to be used; for this reason this frequency-dependent control voltage has to be added to the one resulting from the phase-comparison circuit.

A converting method, other than the integration or differentiation, in which a subsequent rectification may be omitted, because the voltage is at once produced with its D.C. voltage portion, is the employment of a binary storage device which stores the polarity of the peak value which occurred last. One of the best known circuit arrangements of this type is the bistable multivibrator.

A further feature of the invention consists in that the phase-comparison circuit can be modified in such a way that it operates as a binary storage device itself, so that no additional investments will be necessary. This can be achieved, for example, in that the rectifier sections of the phase-comparison circuit are biased. Another possibility is offered by the employment of voltage-dependent or voltage-controlled resistors for acting as rectifying sections. One example of the inventive type of circuit arrangement for pulse-shaped signals is shown in FIG. 7. The synchronizing pulses are fed in opposite phase relation to the terminals 7 and 8. The capacitor 9 feeds the positive synchronizing pulses to the anode of the diode 11, and the capacitor 10 feeds the negative impulses to the cathode of the diode 12. The two other electrodes of the diodes 11 and 12 are connected across the battery 13, which is in parallel with the capacitor 14, and with the series combination of resistors 15 and 16. The connecting point betwen the two resistors is connected to ground. If the control voltage is supposed to be superimposed by a biasing potential then, of course, the connecting point may be applied to such a biasing potential. The comparison impulses coming from the deflecting generator are applied to the terminal 17. The comparison impulses are attenuated and differentiated by the capacitor 19 and the series-connected resistors 15, 16, and 18. The thus obtained control voltage is taken off the connecting point between the two resistors 20 and 21, and filtered with the aid of the filter element 22, 23, 24 and 25. The size of the sync pulses is to approximately correspond to the peak values of the differentiated comparison impulse. The battery voltage has about three times the value of the peak values, so that each diode is biased with about 1.5-times the value of the peak values.

We first of all consider the case in which the frequency as well as the phase already assumes the nominal value. FIG. 8 shows the synchronizing pluses applied to the terminal 7. FIG. 9 shows the synchronizing pulses applied to the terminal 8. FIG. 10 shows the comparison impulses as applied to the terminal 17, and FIG. 11 shows the differentiated comparison impulses. To the diode 11 the difference voltage is applied from the voltage as shown in FIG. 8, and of that shown in FIG. 11. FIG. 12 shows the voltage applied to the diode 11, and FIG. 13 shows the voltage applied to the diode 12. The two dot-and-dash lines in the two drawings indicate half the value of the battery voltage, with which each diode is biased. The shaded or hatch-lined surfaces indicate the voltage range in which the diode current is flowing. As will be seen, the surface areas are alike or equal, that is in the medium with respect to time the sum current is equal, so that no control voltage is produced.

In the second operating condition, which is now supposed to be considered, the frequency already is synchronous, but the phase deviates from the nominal value. FIG. 14 shows the voltage as applied to the diode 11. FIG. 15 shows the voltage at the diode 12. It will be easily recognized that the surface area of the hatch-lined or shaded surfaces in FIG. 15 is noticeably larger than the one in FIG. 14.

In consequence thereof a control voltage is produced, by which the voltage courses are so displaced until the surface areas are equal again. This directional voltage is tapped from the connecting point between the resistor 20 and the resistor 21. In the case of a phase shift into the other direction a directional voltage is produced with an opposite polarity.

The third case of operation which may be of interest, is the one in which the frequency deviates. If the deviation is lying within the pull-in range of the phase-comparison circuit, then the conditions are the same as in all of the conventional types of phase comparators: the synchronization is restored to normal and changes over to the second operating condition. Finally, that case is of a particular interest in which the frequency deviation is so large that it is lying outside the pull-in range. In this particular case all phase positions are passed through at the difference frequency. If, for example, the sync pulses are shifted by 180° with respect to the comparison voltage, and if the sync pulses are about the same size as the peak values of the comparison voltage, and if furthermore the biasing potential of each diode is 1.5-times as high as that of the peak values, then a current will be flowing neither in the one nor in the other rectifying section. Since no direct-current path is completed the control voltage potential remains indifferent within a control voltage range of ±½ peak value. The last value of the potential which existed when the rectifying current was still flowing, is retained until a new rectifying current is flowing. Quite depending on the drift direction, the shape of the difference-frequency voltage is the same, as is shown in FIGS. 4 and 5, with the difference that the two peak values, with respect to the potential zero, are equal, so that their mean value with respect to time is a direct-current voltage, which depends on the drift direction. Finally, the filter elements 22, 23, 24 and 25 effect a filtering-out of the alternating-current voltage portion. Accordingly, this frequency-dependent control voltage effects an actuation of the retuning device, which leads the frequency of the deflecting generator very closely to the rated frequency, so that the pull-in range of the phase comparison circuit is reached, and the operating condition 2 will be assumed. The battery, finally, can be materialized in the well-known manner by means of a voltage divider which is generally connected with the operating voltage. Likewise it is appropriate to produce at least a portion of the biasing potential automatically by means of the medium rectifier current with the aid of a resistor-capacitor combination, in order to dispose of a biasing potential which is better suited to adapt itself to the tolerances.

In the shown circuit arrangement the coupling capacitors 9 and 10 simultaneously serve as charging capacitors. They are charged by the diode currents. The charging-time constant, which is supposed to be as small as possible, is determined by the size of capacities of these capacitors, and by the value of the internal resistances of the pulse sources, including the internal resistances of the rectifying sections. The discharge-time constant, which is supposed to be as large as possible, in order that the storage effect becomes completely effective, is determined by the capacity value of the two capacitors 9 and 10, by the insulation resistance of the lines conducting the control voltage, as well as by the backward resistance of the rectifying sections.

As already mentioned, it is also possible to use other types of non-linear elements, such as voltage-dependent resistors, glow-discharge gaps, gas-discharge gaps, etc., as rectifying sections. The last mentioned elements provide characteristic biasting potentials. Furthermore, it is possible to use amplifier tubes, or preferably transistors as rectifiers. Transistors are particularly suitable when using one npn-type transistor and one pnp-type transistor. As is well-know, transistors are extremely low-ohmic switching devices, so that the problem of the time-constant can be solved in a very simple way.

The average- or mean-value voltage of the converted difference-frequency voltage, of course, is lower than the peak-value voltage. The peak-value voltage is identical with the highest phase-comparison control voltage (in case the frequency of the signals to be compared is equal). The mean-value voltage is identical with the highest frequency-comparison control voltage (in case the frequency of the signals to be compared is unequal). Accordingly, we have to reckon with a frequency pull-in range which is substantially larger than the phase pull-in range. Above all this range is independent of the filtering quality, but smaller than the hold range. In this case the term phase pull-in range is supposed to indicate the pull-in range which results merely on account of the phase comparison, in distinction to the much larger frequency pull-in range which results on account of the additional frequency comparison.

In the following there will now be described an example of embodiment serving the automatic generation of the biasing potential by means of a resistor-capacitor combination.

It is generally known that the time-constant of a combination consisting of a resistor and a capacitor for producing a biasing potential has to be so large that the biasing potential is constant even in the presence of the lowest frequency.

In the present case the lowest frequency is the difference frequency which appears shortly before the pulling-in of the synchronization. In other words: the limiting or cut-off frequency of the phase pull-in range.

The resulting biasing potential is in proportion to the biasing voltage resistance, and in proportion to the mean value of the rectifier currents. The mean value of the rectifier currents itself, however, is rather considerably dependent upon the difference frequency. On account of this dependency the thus obtained biasing potential is likely to vary to an extent of 10 to 20 percent. As a rule, a portion of the biasing potential will add itself to the control voltage. If $U_r(\Delta f)$ is the control voltage in dependency upon the difference frequency when employing a biasing voltage battery, if $\overline{U_r}(\Delta f)$ is the control voltage in dependency upon the difference frequency when employing an automatic biasing potential, and if $U_B(\Delta f)$ is the automatic biasing potential produced with the aid of the resistor and the capacitor, and if K is the portion of the automatic biasing potential which superimposes itself upon the frequency-dependent control voltage, then $$\overline{U_r}(\Delta f)=U_r(\Delta f)+KU_B(\Delta f)$$

Figure 16A:
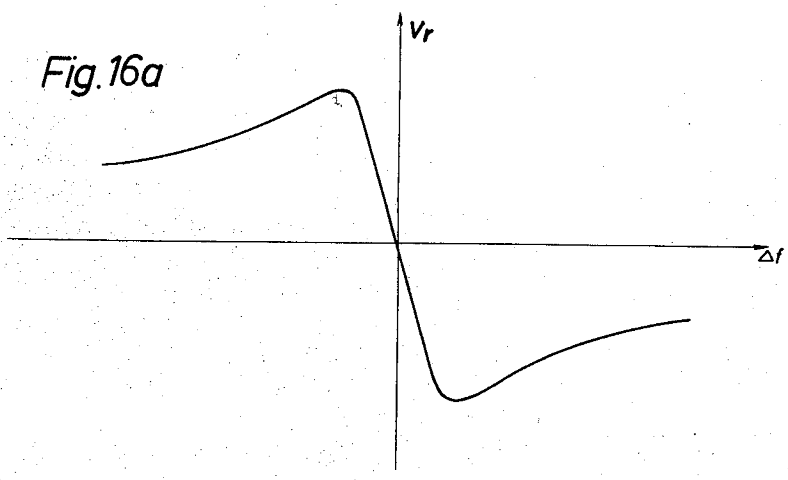

FIG. 16*a* by way of example shows the function $U_r(\Delta f)$.

Figure 16B:
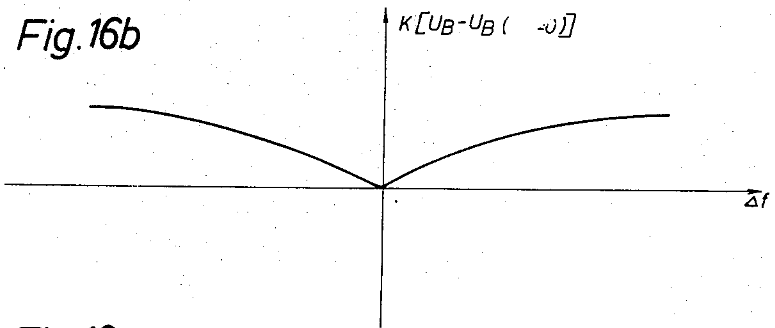

FIG. 16*b* by way of example shows the function K $$K[U_B(\Delta f)-U_B(\Delta f=0)]$$

Figure 16C:
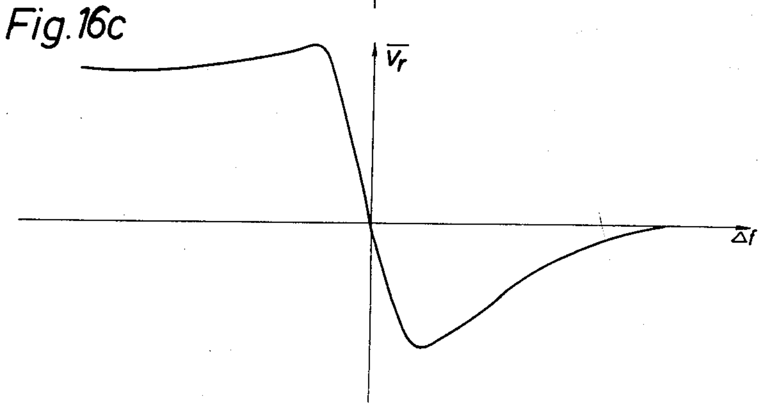

FIG. 16*c* shows the resulting control voltage $\overline{U_r}(\Delta f)$.

As will be seen, $\overline{U_r}(\Delta f)$ is asymmetrical, the inclination of the right-hand part of the function is substantially greater than the inclination of the left-hand part.

In a particularly advantageous example of embodiment the phase- and frequency-comparison circuit operates as a bridge circuit in such a way that the biasing potential produced by the resistor-capacitor combination, is lying in the one branch of the bridge circuit, and the source of control voltage in the other branch of the bridge circuit, and that the bridge circuit itself is so dimensioned that no or only an admissibly small portion of the biasing potential is added to the control voltage. In this way K becomes equal or almost equal to zero, so that $$\overline{U_r}(\Delta f)=U_r(\Delta f)$$

As a rule, a small asymmetry is of no importance, so that small values of K may be admitted. In this way it is possible to add such a portion of the rectifier bias to the control voltage, that the latter at the same time serves as the biasing potential for the subsequently following retuning stage. The value of this portion is appropriately chosen thus that the two extreme values of the control voltage, i.e., of the control voltage resulting from the frequency comparison, are lying symmetrically in relation to the working point of the retuning stage, because the two extreme values of the control voltage resulting from the phase comparison (if the signals to be compared are of equal frequency) are considerably higher, so that any probable asymmetry of these extreme values in relation to the working point of the retuning stage is admissible without causing any disadvantage.

FIG. 17 shows an exemplified circuit arrangement according to the invention. In this example of a circuit arrangement the bridge circuit is materialized in that the resistor of the biasing potential-RC-combination is provided in the vicinity of the electrical centre with a variable tap, from which the control voltage is taken. With the aid of this variable tapping the above mentioned adjustment of the biasing potential for the retuning stage can be carried out. In addition thereto the two portions of the bias resistance, which are divided by the tapping, serve in their parallel arrangement as an additional filter resistance which, in combination with the filter capacitor, acts to determine the control time-constant. By this double utilization it is achieved that the direct-current path extending in the backward direction via the comparison circuit towards ground, does not become high-ohmic to an unnecessarily high extent.

In FIG. 17 the synchronizing impulses are fed to the control grid of the triode 2 via the coupling capacitor 1. Resistor 3 is used as a grid resistance. From the cathode resistor 4 the synchronizing pulses are fed via the coupling capacitor 5 to the cathode of the diode 6. From the anode resistor 7 the phase-reversed synchronizing pulses are fed to the anode of the diode 9 via the coupling capacitor 8. Both resistors 10 and 11 serve as diode-leak resistors; they are connected by the bias capacitor 12 and by the resistors 13, 14 and 15 serving as bias resistors. Resistor 15 is the adjusting resistor for adjusting the desired portion of biasing potential for the next successive returning stage. The range of variation of this resistor is restricted in this particular example by the two resistors 13 and 14. Of course, the biasing resistor may also consist of a single adjusting resistor. Reference numeral 16 identifies the filter capacitor, 17 and 18 denote a further filter circuit. The two other electrodes of the diodes 6 and 9 are first connected with one another, and then to ground via the resistor 19. The capacitor 21, the resistor 20 and the resistor 19 serve the differentiation of the comparison impulses. These differentiated comparison impulses are fed to the connected electrodes of the diodes as a comparison voltage.

The above is the description of an example in which a comparison voltage is used which consists of two immediately successive impulses of a positive and negative polarity, and in addition thereto two phase-reversed synchronizing-pulse voltages are fed to the comparison circuit. The two immediately successive impulses of the comparison voltage are obtained, e.g., by a differentiation of the flyback-pulse voltage of a sweep transformer.

However, it may also be of advantage if the synchronizing voltage consists of two directly successive impulses of a positive and negative polarity, and if two comparison-impulse voltages of opposite polaritly are used, and if the peak values of the comparison voltages, as well as the peak values of the synchronizing voltages are approximately equal.

This reversal has two advantages. The first advantage resides in the fact that the flyback-pulse voltage which is usually derived in the horizontal or line-scan of television receivers from the deflecting or sweep transformer, may have an unequal steepness of the pulse edges. Such an inequality does happen in the case of a superposition of partial oscillations. For example, it is known to purposely lift the third upper harmonic of the flyback impulse consisting of a sinusoidal half-wave, with the aid of leakage inductances and winding capacitances of the deflecting or sweep transformer during the horizontal sweep in television receivers, in order to reduce the internal resistance of the picture-tube radio voltage which is derived from the same transformer. Such a flyback impulse with an unequal steepness of the pulse edges is converted by a differentiation into a very asymmetrical voltage, as regards the mean value with respect to time, so that the two successively following impulses of different polarity also have very different amplitudes, thus preventing the comparison circuit from operating in the optimum manner.

In the case a reversal of different steepness of the edges of the flyback pulses cannot have a disturbing effect, because the comparison impulses are applied directly and not in a differentiated condition to the comparison circuit which, on account of the biasing potential of the rectifiers, only uses the pulse peaks for the rectification. To produce such comparison impulses, it is easily possible to wind an impulse winding with a grounded centre tap on to the sweep or deflection transformer, so that the two phase-reversed comparison voltages can be taken off the two ends of the winding.

The synchronizing voltage which consists of two directly successive impulses of a positive and negative polarity, is most suitably obtained by a differentiation of the original synchronizing-pulse voltage. Since this original synchronizing-pulse voltage, in contradistinction to the flyback-pulse voltage, does not consist of sinusoidal half-waves, but of rectangular impulses, this case of the differentiation performed with the aid of a simple RC-circuit is to be preferred to a differentiation with the aid of a highly attenuated oscillating circuit. In this way a double impulse is obtained with about the same amplitude and in which the two opposing halves of the oscillation have equal surface areas. A slight after-oscillation is admissible, because the comparison circuit as already mentioned, and on account of the rectifier bias, only responds to the highest amplitudes. The differentiation with the aid of a highly attenuated oscillating circuit, which is known per se, has in this particular connection the special added advantage that short noise peaks, such as noise voltages, only cause very small amplitudes which, due to the biasing potential, do not cause a diode current, so that by noise voltages neither the storage property is affected nor the frequency pull-in range of the phase- and frequency-comparison circuit is reduced. By the term frequency pull-in range there is supposed to be understood the pull-in range effected by the frequency comparison, in distinction to the substantially smaller phase pull-in range, which is caused by the phase comparison.

The following is a description of exemplified embodiments of circuit arrangements which use sawtooth-shaped voltages as comparison voltages. By the term sawtooth-shaped voltages such types of voltages are to be understood hereinafter, which have a relatively steep flpback, but an extensively random sweep. In order to obtain, in spite thereof, the form of a phase-comparison characteristic which is necessary for the storing performed with the aid of the biasing potential (as in FIG. 1) and which results without the biasing potential, this particular type of exemplified embodiment employs a coincidence circuit for the synchronizing pulses. This coincidence circuit takes care that only such synchronizing pulses reach the comparison circuit whch arrive simultaneously with the flyback of the comparison voltage. It is of advantage that one of the tube systems operating as the amplitude filter, additionally also operates as a coincidence stage. Sawtooth-shaped reference or comparison voltages are used, for example, for the synchronization of the horizontal sweep in television receivers, if the employed horizontal sweep transformer delivers rebound impulses which do not become symmetrical by the differentiation, for example, in the case of transformers with raised upper harmonics for reducing the internal radio-voltage resistance. Furthermore, during the vertical deflection, only sawtooth-shaped voltages appear, so that in this case also only sawtooth-shaped comparison voltages are available as comparison impulses.

FIG. 18 shows a further advantageous modification of a circuit arrangement serving the synchronization of the horizontal sweep in television receivers. The synchronizing pulses are applied to the first control grid of the coincidence stage 1 via the coupling capacitor 2. Reference numeral 3 indicates the leakage resistance. The rebound impulses of the horizontal sweep transformer are applied to the second control grid via the coupling capacitor 5 as a coincidence voltage. In FIG. 18 the horizontal sweep transformer is denoted by the winding 4. The pulse transformer 6 on the anode side applies the output impulses in phase opposition to the two diodes 7 and 8, which are biased by the battery 9. In an advantageous manner the battery may be replaced—as already described in detail hereinbefore—by a resistor-capacitor combination. The sawtooth voltage obtained by the integration of the flyback impulses is applied to the centre of the secondary winding of the impulse transformer 6. The integration itself is effected with the aid of the resistor 10 and the capacitor 11. Reference numeral 12 indicates the leakage resistance of the second control grid. 13 indicates the screen grid resistance, and 14 indicates the screen-grid block capacitor. The capacitor 15 acts as a storage capacitor which, in the case of a deviating frequency, serves to store the last-occurring potential of the peak value, so that the mean value of the difference-frequency alternating voltage with its polarity is dependent upon the frequency deviation. The filter circuit 16, 17, 18 and 19 serves the noise-suppression purpose. The filtered control voltage is finally applied to a retuning arrangement, which is not particularly shown in FIG. 18, to adjust the frequency of the pulses applied to the transformer 4.

The value of the synchronizing pulses is supposed to be approximately in accordance with the peak values of the comparison voltage within the coincidence region. The magnitude of the biasing potential amounts to about three times that of the peak values, so that each diode is biased with a potential of about 1.5 times the magnitude of the peak values. The storage charging time-constant, which is supposed to be as small as possible, is determined by the capacity of the storage capacitor and by the value of the internal resistances of the pulse sources including that of the internal resistances of the rectifying sections. The discharge time-constant, which is supposed to be as long as possible, in order to enable the storing effect to be completely utilized, is determined by the capacity of the storage capacitor 15, by the value of the insulating resistance of the lines or leads conducting the control voltage, and by the value of the backward resistance of the rectifier sections, as well as of the filter resistance 16. It is also possible to use other types of non-linear elements, such as voltage-dependent resistors, glow-discharge gaps, gas-discharge gaps, etc. as rectifying sections. The last mentioned elements even already have a biasing potential of their own.

The mean-value voltage of the converted difference-frequency voltage, of course, is lower than the peak-value voltage. The peak-value voltage is identical with the highest phase-comparison control voltage (in case the frequency of the signals to be compared is equal). The mean-value voltage is identical with the highest frequency-comparison control voltage (in case the frequency of the signal to be compared is unequal). Accordingly, there has to be reckoned with a pull-in range which is substantially larger than the phase-comparison pull-in range. Above all, this range is independent of the filtering quality, but smaller than the hold range.

In circuit arrangements with a very low difference frequency, for example, in synchronizing circuits employing the vertical deflection in television receivers, the storage-discharge time-constant must be a very long one. In these cases, in order to achieve a further increase of the time-constant, the filter circuit may also be electronically separated from the storage capacitor.

FIG. 19 shows a modified circuit arrangement for the synchronization of the vertical deflection in television receivers. In this FIG. 19 reference numeral 1 indicates the coincidence stage. To this circuit the synchronizing pulses are applied via the coupling capacitor 2. Reference numeral 3 indicates the leakage resistance. To the second control grid a parabola voltage is applied via the coupling capacitor 4 as a coincidence voltage, which has such a high amplitude that only the peak values serve to unblock the tube. Reference numeral 5 indicates the leakage resistance of the second control grid. The parabola voltage is produced by an integration of the sawtooth-voltage derived from the sweep transformer with the aid of the resistor 6 and of the capacitor 7. The sweep transformer is not particularly shown in FIG. 19. Via the pulse transformer 8 the output pulses are fed to the rectifying sections 9 and 10. The sawtooth-shaped voltage is applied as a reference or comparison voltage to the centre of the secondary winding.

As rectifying sections it is possible to use two gas-discharge gaps, such as the glow-discharge gaps shown in FIG. 19. These rectifying sections have the advantage that their backward resistances are very high and that they themselves already produce the biasing potential. As the biasing potential it is possible to use the ignition voltage of the glow-discharge gaps. Reference numeral 11 indicates the storage capacitor. The voltage of the storage capacitor is applied to the control grid of tube 12, which operates as an impedance converter. Together with the resistor 13 this voltage is subjected to a current feedback. Reference numeral 14 indicates the leakage resistance which, in connection with the capacitors 15 and 16, and the resistor 17 forms the filter circuit. The control voltage derived from the filter circuit is applied to the grid resistance 18 of the blocking oscillator tube 19. The grid-resistance 18, the grid capacitor 20, and the amplitude of the control voltage determine the relaxation frequency of the blocking oscillator. Reference numeral 21 indicates the transformer of the blocking oscillator, 22 the anode resistance, and 23 the charging capacitor of the blocking oscillator, at which a sawtooth voltage appears which, finally, serves in the conventional manner as the control voltage for a relaxation-output stage not particularly shown in FIG. 19.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A phase and frequency comparison circuit comprising sources of first and second trains of periodic pulse signals, a pair of oppositely polarized gating means coupled to said sources and responsive exclusively to the coincident presence of pulses in said first and second trains to produce a third train of pulses having a mean amplitude determined by the relative phases of said coincident pulses and a frequency determined by the frequency of coincidence of said pulses in said first and second trains, and means coupled to said last mentioned means for producing a direct current control signal varying in accordance with said mean amplitude of said third pulses.

2. A phase and frequency comparison circuit comprising a first source of periodic pulse signals, means coupled to said first source for converting said pulse signals to provide first pulse signals having consecutive positive and negative phases, a second source of periodic second pulse signals providing separate simultaneous positive and negative phases, a pair of oppositely polarized gating means coupled to said first and second sources and exclusively responsive to the coincident presence of said first and second pulse signals to produce third pulse signals having amplitudes and polarities determined by the said phases of said converted first signal in relation to said second signal, and control circuit means coupled to said gating means for converting said third signals to a direct current control voltage varying in accordance therewith and having a response time characteristic which is short in relation to the period of the maximum expected difference in the frequency of coincidence of said first and second pulse signals.

3. A phase and frequency comparison circuit comprising first and second sources of respective first and second periodic pulse signal trains, said first source providing simultaneous separate positive and negative phases and said second source providing consecutive positive and negative phases, differentiating means coupled to one of said sources for producing a plural phase signal in response to each pulse issuing from said source, a pair of oppositely polarized coincidence gating means coupled to said differentiating means and the other of said sources for producing a plural phase signal having a mean amplitude proportional to the difference in the frequencies of said first and second sources, and a polarity determined by the polarity of said difference frequency.

4. A phase and frequency comparison circuit comprising first and second sources of periodic pulse signals, one source providing simultaneous separate positive and negative phases and the other source providing consecutive positive and negative phases, a pair of oppositely polarized coincidence gating means coupled to said sources for producing a pulse output signal in response to the coincident presence of said first and second pulse signals, means biasing said gating means to prevent conduction below a predetermined signal level, means coupled to said coincidence gating means for converting said output signal to a direct current phase difference indicating signal with a polarity dependent upon the relative phases of said first and second coincident pulse signals and with a mean amplitude proportional to the frequency of coincidence of said first and second pulse signals.

5. A circuit according to claim 4 wherein said coincidence gating means includes first and second oppositely polarized rectifying sections.

6. A circuit according to claim 4 wherein said coincidence gating means includes a multi grid tube having first and second grids coupled to said respective first and second sources, and an output plate circuit coupled to said first and second rectifying sections.

7. A circuit according to claim 4 wherein said other source includes means for differentiating the output thereof to provide said consecutive positive and negative phases.

8. A circuit according to claim 5 wherein said other source provides a sawtooth shaped signal, and further including oscillator means coupled to said converting means for producing output sawtooth oscillations at a frequency corresponding to said mean amplitude of said phase difference indicating signal.

9. A circuit according to claim 5 including biasing means connected to said first and second rectifying sections for preventing current fow therethrough when said pulses of said first and second sources are not coincident.

10. A circuit according to claim 9 wherein said biasing means includes a resistor-capacitor network for storing a portion of the current flowing through said rectifying sections for a predetermined time interval following each said pulse output signal.

References Cited in the file of this patent

UNITED STATES PATENTS

| | | |
|---|---|---|
| 2,742,591 | Proctor | Apr. 17, 1956 |
| 2,812,435 | Lyon | Nov. 5, 1957 |
| 2,852,717 | McCurdy | Sept. 16, 1958 |
| 2,853,650 | Close | Sept. 23, 1958 |
| 2,864,954 | Byrne | Dec. 16, 1958 |
| 2,876,382 | Sziklai | Mar. 3, 1959 |
| 2,882,447 | Shulman | Apr. 14, 1959 |
| 2,898,458 | Richman | Aug. 4, 1959 |
| 2,923,851 | Washburn | Feb. 2, 1960 |